Feb. 12, 1946.    R. E. ARMSTRONG    2,394,836
FEED MECHANISM
Filed April 4, 1944

INVENTOR.
ROBERT E. ARMSTRONG
BY
D. Verner Smythe
ATTORNEYS

Patented Feb. 12, 1946

2,394,836

UNITED STATES PATENT OFFICE 2,394,836

FEED MECHANISM

Robert E. Armstrong, Ottumwa, Iowa, assignor to Remington Arms Company, Inc., Bridgeport, Conn., a corporation of Delaware Application April 4, 1944, Serial No. 529,553

10 Claims. (Cl. 193—43)

The present invention relates, in general, to a feeding device, and, in particular, to improved means for feeding and orienting battery cups being delivered to a shot shell heading machine.

Although the embodiment of the invention illustrated and described herein is especially adapted for use in a delivery tube of a hopper for feeding battery cups to a shot shell heading machine, it will be understood that the present invention may be used for feeding and orienting primer cups and other similarly shaped articles; and that the invention is not limited to the exemplary embodiment shown, but embodies all modifications thereof within the scope of the appended claims.

In general, battery cups, primer cups and similarly shaped articles to be fed to automatic cartridge manufacturing and assembling machines are deposited in bulk into a hopper which is adapted to segregate the articles and feed them successively in predetermined end-to-end relationship into a delivery tube through which the articles are delivered by gravity to the machine. Occasionally, however, one of the articles enters the discharge tube in inverted position which condition causes jams and other malfunctioning at the machine giving rise to scrap material, tool breakage and "down time."

An object of the present invention is to provide improved means for feeding and orienting articles. A further object is to provide a device reciprocable to and from a hopper delivery tube for controlling the free fall of articles through the tube and to feed the articles successively to an orienting member.

These and other objects, features and advantages of the invention will be described more fully in the following specification.

Figure 1:
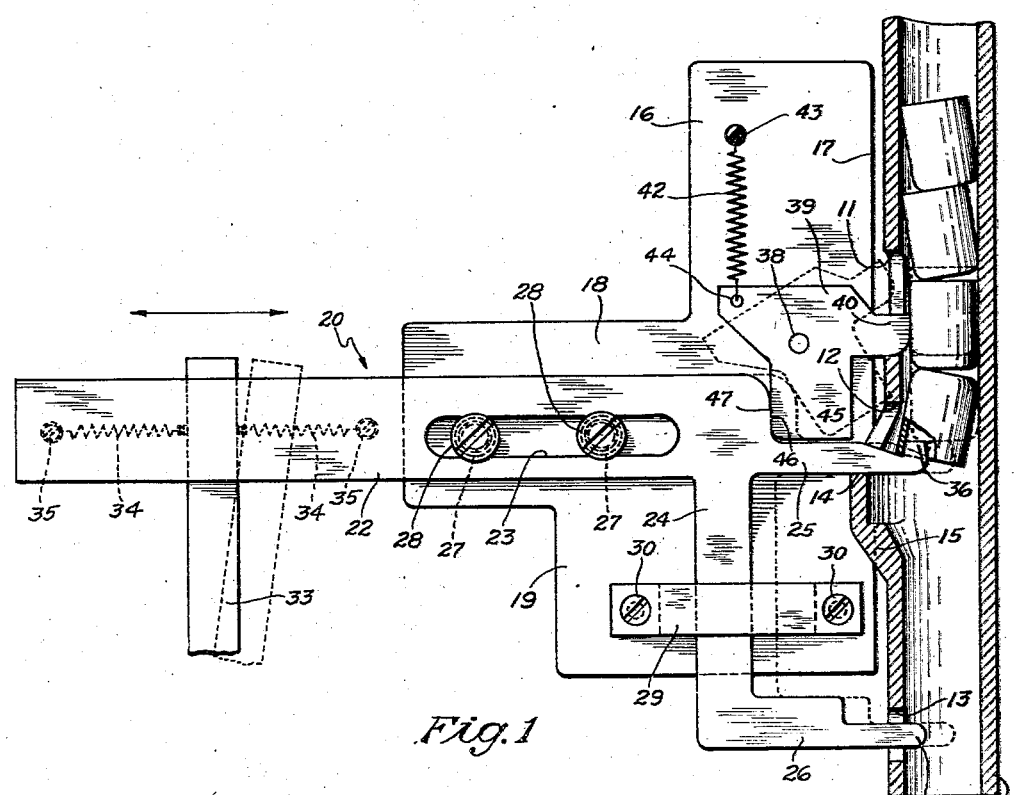
Fig. 1 is an elevation partly in section of the improved feeding and orienting means of this invention shown by the full lines in its normal position with respect to the delivery tube of a hopper and by the dotted lines in position for feeding articles to the orienting means.

Referring to the drawing, 10 denotes a fragment in section of a hopper delivery tube which, as shown, is provided with three axially aligned apertures comprising two longitudinal slots 11 and 13 and a substantially round hole 12 of suitable dimensions to receive the article feeding and orienting elements described below. The lower edge of the middle aperture 12 comprises an outwardly or rearwardly protruding lip 14 which may be an integral part of the wall of the tube and formed by stretching and upsetting an adjacent portion 15 of the wall of the tube to increase the width of the tube at this point over the normal diameter of the tube. The lip 14 is adapted to provide a guide and supporting surface for the article orienting member hereinafter described.

Fixedly mounted in a vertical plane parallel to a vertical plane through the longitudinal axis of the apertures 11, 12 and 13 and radial to the tube 10 is a base plate 16, the forward or right-hand edge 17 of which is in proximity to the adjacent wall of the tube 10, as shown in Fig. 1. The base plate comprises a rearwardly extending portion 18 and a lower portion 19 which define a surface on which a carrier member, indicated generally at 20, is slidably mounted. The carrier comprises a piece of flat metal or other suitable material of compatible stiffness embodying a reach 22 having a closed slot 23 extending longitudinally thereof; and a depending leg portion 24 extending at substantially right angles to the reach and provided at its upper and lower ends with forwardly extending fingers 25 and 26 respectively, both at substantially right angles to the leg 24.

The carrier or carriage 20 is supported on the base plate by a pair of substantially horizontal spaced pins 27 which are fastened in the base plate and have hubs of a diameter to make a nice sliding fit between the longitudinal edges of the slot 23. The pins 27 are also provided with heads or flanges 28 adapted to overlie the longitudinal edges of the slot 23 to slidably hold the carriage 20 against the vertical face of the base plate. A strap 29 is secured by suitable fastening means 30 and spacers 32 to the lower portion 19 of the base plate and spans the depending leg portion 24 of the carrier to guide it during its reciprocating movement over the surface of the base plate.

Suitable actuating means are provided, as indicated at 33, for reciprocating the carriage 20 and transferring thereto a stroke of predetermined length. The actuator 33 is connected to the carriage by a pair of coil springs 34, one end of each spring being fastened on opposite sides respectively on the actuator 33, the opposite end of each spring being secured by a screw 35 or other fastening means adjacent the rear end of the reach 22. By means of this resilient connection between the actuator 33 and the carriage 20, the latter is enabled to move relative to the actuator 33 to compensate for any slight variations in the size of the articles passing through the tube 10; to avoid breakage of the fingers 25 and 26 in the event an article becomes jammed in the tube; and to enable the actuator to move relative to the carriage when the latter has been stopped by the presence of a cup at a predetermined level in the tube as hereinafter described.

Figure 2:
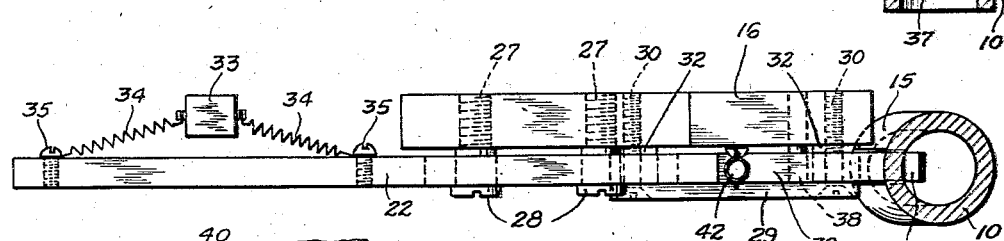
Fig. 2 is a plan view of the feeding and orienting means of Fig. 1.
Figure 3:
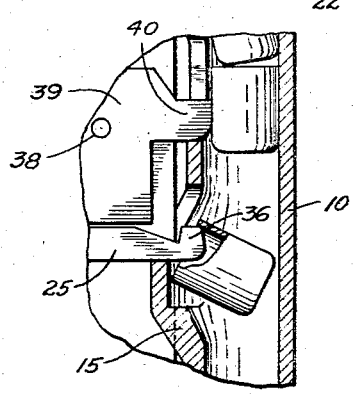
Fig. 3 is a fragmentary elevation partly in section showing the feeding and orienting means in position for orienting an article.

The finger 25 is adapted to orient inverted cups, and to this end rests on and is guided by the lower lip 14 of the aperture 12 and is provided at its forward extremity with a hook 36. When the finger is in its advanced position in the tube 10, see dotted line position in Fig. 1, the hook 36 is adapted to be engaged by the end of a cup dropping down through the tube 10. Normally, the bottom or closed end of a cup will engage on the hook, and, as the carriage is moved rearwardly, the hook 36 will be drawn out from beneath the bottom of the cup, thereby releasing the cup and enabling it to drop down through the tube 10. However, as shown in Figs. 2 and 3, when a cup is inverted, its open end will be engaged over the hook 36, and, as the latter is moved rearwardly, the cup and more especially the rim portion which is engaged on the hook 36, will be carried rearwardly into the aperture 12 in the wall of the tube 10 bringing the upper end of the cup into engagement with the adjacent upper rim portion of the aperture 12. Because of the increased width of the tube at the lip 14, the cup will be free to pivot clockwise about the hook 36, and hence turns over or is oriented so that it passes on down into the tube bottom end first.

The finger 26 is adapted to enter the aperture 13 of the tube to inspect for the presence of a cup at this level. If the tube is full of cups up to the level of the aperture 13, then the reduced end 37 of the finger 26 will engage a cup whereupon the latter stops the finger from advancing into the tube. As a consequence, the passing of additional cups down through the tube is prevented as described below.

Supported on the base plate 16 adjacent the forward end thereof substantially opposite the aperture 11 of the tube 10 is a cup feding member or plate 39 which is pivoted at 38 to the base plate and provided with a shoe 40. The latter is adapted normally to extend into the aperture 11 of the tube 10 to frictionally engage an article opposite the aperture 11 and press it against the wall of the tube 10 to temporarily prevent the article from falling down onto the orienting hook 36. The lower edge of the slot 11 constitutes a stop for the under edge of the shoe 40, the latter being normally held in engagement therewith by a coil spring 42 which is secured at its upper end to the base plate 16 by a pin 43 and at its opposite end to the feed plate at a point 44 thereon substantially diametrically opposite the shoe 40.

The feed plate 39 has a depending substantially rectangular heel portion 45 provided with a normally vertical shoulder 46 which is located rearwardly of the axis 38 of the plate 39. The shoulder 46 is adapted to engage a shoulder 47 on the forward end of the carriage 20. Thus, as the carriage moves forwardly, its shoulder 47 pivots the feed plate 39 counterclockwise, see Fig. 1, thereby elevating the shoe 40 in the aperture 11 and withdrawing the shoe out of the tube against the resistance of the coil spring 42. As a result, the cup engaged by the shoe 40 is released and freed to fall down the tube onto the orienting hook 36. As soon as the carriage begins to recede, its shoulder 47 is retracted enabling the force of the coil spring 42 to pivot the plate 39 clockwise so that its shoe 40 reenters the tube 10. In so doing, the shoe engages the next succeeding cup in the tube and temporarily holds it from passing down the tube. Simultaneously with the rearward movement of the carriage, the hook 36 releases the cup which has fallen thereon or if the cup was inverted orients the cup and enables it to pass down the tube as described above. Furthermore, the column of cups above the orienting hook 36 will be held by the shoe 40 until the carriage has again advanced to displace the shoe and release one of the cups. In this connection, it will also be noted that whenever the forward movement of the inspection finger 37 is stopped by engagement with a cup at the aperture 13 of the tube, the forward movement of the carriage is stopped, and hence the feed shoe 40 remains in its normal position thereby preventing the cups from feeding down the tube.

In accordance with the improved feeding means of this invention, articles moving down the tube are temporarily held up while awaiting the proper orientation and release of a preceding article. Moreover, should the hopper tube become filled, further feeding and orientation of the cups is stopped until the column of cups in the hopper tube is lowered.

What is claimed is:

1. A device for feeding and orienting articles comprising a fixed base; article orienting means slidably mounted on said base; means for reciprocating said orienting means; article feeding means pivotally supported on said base and adapted normally to hold an article from moving onto said orienting means; and a shoulder on said feed means constructed and arranged to be engaged by said reciprocating means and to be oscillated thereby to release an article thereto.

2. A device for feeding and orienting articles comprising a fixed base; article orienting means slidably mounted on said base; means for reciprocating said orienting means; article feed means pivotally supported on said base and adapted normally to hold an article from moving onto said orienting means; a shoulder on said feed means constructed and arranged to be engaged by said reciprocating means and to be oscillated thereby to release an article thereto; and resilient means for returning said pivoted feeding means to its normal position.

3. A device for feeding and orienting articles comprising a fixed base; article orienting means slidably mounted on said base; means for reciprocating said orienting means; article feed means pivotally supported on said base and adapted normally to hold an article from moving onto said orienting means; a shoulder on said feed means constructed and arranged to be engaged by said reciprocating means and to be oscillated thereby to release an article thereto; resilient means for returning said pivoted feeding means to its normal position; and stop means for holding said feeding means in its normal position against the force of said resilient means.

4. A device for feeding and orienting articles comprising a fixed base; a carriage slidably mounted on said base, said carriage having an integral article orienting finger and a shoulder adjacent said finger; article feed means pivotally mounted on said base, said feed means having a shoulder in engagement with the shoulder of said carriage; a shoe on said feed means adapted normally to hold articles from moving onto said orienting finger; and means for reciprocating said carriage on said base whereby the engagement of the shoulder of said carriage with the shoulder of said feed means pivots said shoe out of holding contact with an article to release said article to said orienting finger.

5. A device for feeding and orienting articles comprising a fixed base; a carriage slidably mounted on said base, said carriage having an integral article orienting finger and a shoulder adjacent said finger; article feeding means pivotally mounted on said base, said feeding means having a shoulder in engagement with the shoulder of said carriage; a shoe on said feed means adapted normally to hold articles from moving onto said orienting finger; means for reciprocating said carriage on said base whereby the engagement of the shoulder of said carriage with the shoulder of said feed means pivots said shoe out of holding contact with an article to release said article to said orienting finger; and a coil spring secured to said base and said feed means to return said feed means to its normal article holding position.

6. In an article feeding device, the combination with a fixed article delivering tube; of article orienting means comprising a movable carriage having a finger constructed and arranged to enter said tube in the path of articles being delivered therethrough; means to actuate said carriage for entering said finger into said tube; an article feed means supported above said carriage and adapted normally to extend into said tube to temporarily engage and hold an article in the tube from moving onto said finger, said feed means being constructed and arranged to be actuated by said carriage when said finger enters said tube to release an article thereto; and article inspection means movable with said carriage to detect the level of articles in said tube.

7. In an article feeding device, the combination with a fixed article delivering tube; of article orienting means comprising a movable carriage having a finger constructed and arranged to enter said tube in the path of articles being delivered therethrough; means to actuate said carriage for entering said finger into said tube; an article feed means supported above said carriage and adapted normally to extend into said tube to temporarily engage and hold an article in the tube from moving onto said finger, said feed means being constructed and arranged to be actuated by said carriage when said finger enters said tube to release an article thereto; and a second finger movable with said carriage constructed and arranged to enter said tube below said first finger and to engage a cup therein to stop said carriage and to prevent the actuation of said feed means.

8. In an article feeding device, the combination with an article delivering tube having apertures therein; of a carriage movable with respect to said tube; means for reciprocating said carriage; an article orienting finger integral with said carriage constructed and arranged to enter one of the apertures of said tube into the path of articles being delivered through said tube; a shoulder on said carriage; an article feed means movably mounted above said orienting finger having a shoulder in engagement with the shoulder of said carriage; and a shoe on said feed means adapted normally to enter a second aperture of said tube normally to engage and hold an article therein from moving onto said orienting finger, said feed means being adapted to be moved by reciprocation of said carriage to release the article in said tube to said orienting finger.

9. In an article feeding device, the combination with an article delivering tube having apertures therein; of a carriage movable with respect to said tube; means for reciprocating said carriage; an article orienting finger integral with said carriage constructed and arranged to enter one of the apertures of said tube into the path of articles being delivered through said tube; a shoulder on said carriage; an article feed means movably mounted above said orienting finger having a shoulder in engagement with the shoulder of said carriage; a shoe on said feed means adapted normally to enter a second aperture of said tube normally to engage and hold an article therein from moving onto said orienting finger, said feed means being adapted to be moved by reciprocation of said carriage to release the article in said tube to said orienting finger; and resilient means for returning said feed means to its normal or article holding position when said carriage is moved to withdraw said orienting finger from said tube.

10. In an article feeding device, the combination with an article delivering tube having apertures therein; of a carriage movable with respect to said tube; means for reciprocating said carriage; an article orienting finger integral with said carriage constructed and arranged to enter one of the apertures of said tube into the path of articles being delivered through said tube; a shoulder on said carriage; an article feed means movably mounted above said orienting finger having a shoulder in engagement with the shoulder of said carriage; a shoe on said feed means adapted normally to enter a second aperture of said tube to engage and hold an article therein from moving onto said orienting finger, said feed means being moved by reciprocation of said carriage to enable said shoe to release the article in said tube to said orienting finger; resilient means for returning said feed means to its normal or article holding position when said carriage is moved to withdraw said orienting finger from said tube; and a finger on said carriage constructed and arranged to enter a third aperture of said tube beneath said orienting finger to inspect for articles in said tube.

ROBERT E. ARMSTRONG.